US009488301B2

(12) United States Patent
Bornes

(10) Patent No.: US 9,488,301 B2
(45) Date of Patent: Nov. 8, 2016

(54) REMOVABLE COUPLING DEVICE FOR COUPLING TOGETHER TWO FLEXIBLE PIPES

(71) Applicant: AIRBUS HELICOPTERS, Marignane (FR)

(72) Inventor: Sylvain Bornes, Coudoux (FR)

(73) Assignee: Airbus Helicopters, Marignane (FR)

( * ) Notice: Subject to any disclaimer, the term of this patent is extended or adjusted under 35 U.S.C. 154(b) by 132 days.

(21) Appl. No.: 14/301,737

(22) Filed: Jun. 11, 2014

(65) Prior Publication Data

US 2015/0001843 A1 Jan. 1, 2015

(30) Foreign Application Priority Data

Jun. 28, 2013 (FR) ...................... 13 01519

(51) Int. Cl.
*F16L 23/024* (2006.01)
*B64D 37/08* (2006.01)
*F16L 33/02* (2006.01)
*F16L 13/10* (2006.01)
*B60K 15/03* (2006.01)

(52) U.S. Cl.
CPC ............ *F16L 23/024* (2013.01); *B64D 37/08* (2013.01); *F16L 13/103* (2013.01); *F16L 33/02* (2013.01); *B60K 2015/03144* (2013.01)

(58) Field of Classification Search
CPC ...... B64D 37/06; B64D 37/08; B64D 37/04; F16L 5/00; F16L 5/02; F16L 5/08; F16L 5/10; F16L 5/14; F16L 41/086; F16L 41/088; F16L 41/12; F16L 11/00; B60K 15/01; B60K 2015/03125; B60K 2015/03144
See application file for complete search history.

(56) References Cited

U.S. PATENT DOCUMENTS

| | | | | |
|---|---|---|---|---|
| 2,382,970 A * | 8/1945 | Borcherdt | ................ | F16L 5/08 126/317 |
| 2,560,091 A * | 7/1951 | Davis | ....................... | A62C 3/08 169/62 |
| 3,035,797 A * | 5/1962 | Neuschotz | ............ | B64D 37/04 137/572 |
| 3,397,431 A * | 8/1968 | Walker | .................. | F16L 3/2235 248/68.1 |
| 3,582,096 A * | 6/1971 | Norton | .................... | F16L 39/00 277/606 |
| 4,307,744 A * | 12/1981 | Marrison | ................ | F16K 17/40 137/572 |
| 4,323,094 A * | 4/1982 | Paulis | .................... | B64D 37/16 137/614.03 |
| 4,335,905 A | 6/1982 | Bac | | |
| 4,607,469 A * | 8/1986 | Harrison | .................. | F16L 5/02 138/89 |

(Continued)

FOREIGN PATENT DOCUMENTS

| | | |
|---|---|---|
| CA | 2176822 | 5/1995 |
| DE | 4108894 | 9/1992 |

(Continued)

OTHER PUBLICATIONS

French Search Report for FR 1301519, Completed by the French Patent Office on Mar. 5, 2014, 6 Pages.

*Primary Examiner* — Joseph W Sanderson
(74) *Attorney, Agent, or Firm* — Brooks Kushman P.C.

(57) ABSTRACT

A removable coupling device is provided for coupling together two flexible pipes of two tanks, and also provides a fuel storage system. The removable coupling device has two connector seats, with each connector seat being secured to a respective flexible pipe by adhesive bonding. The connector seats are rigid and are assembled mechanically together via at least one screw. The sealing between the connector seats is provided by a gasket.

20 Claims, 2 Drawing Sheets

(56) References Cited

U.S. PATENT DOCUMENTS

| | | | | |
|---|---|---|---|---|
| 5,271,646 A * | 12/1993 | Allread | ............... | B60H 1/3223 285/124.2 |
| 6,189,333 B1 * | 2/2001 | Cummings | ............. | F16L 39/00 62/474 |
| 6,776,421 B2 * | 8/2004 | Florence | ................ | F16L 39/00 277/602 |
| 7,195,285 B2 * | 3/2007 | Rodousakis | ........... | B64D 37/06 220/23.4 |
| 7,464,966 B2 * | 12/2008 | Miyajima | ................ | F16L 5/10 248/56 |
| 7,878,550 B2 | 2/2011 | Patel et al. | | |
| 7,942,452 B2 * | 5/2011 | Carns | ................... | F16L 23/003 285/123.1 |
| 8,701,467 B2 * | 4/2014 | Carns | ................... | F16L 23/003 285/123.1 |
| 2004/0189004 A1 * | 9/2004 | Wright | ..................... | F16L 5/02 285/189 |
| 2004/0207197 A1 * | 10/2004 | Hoang | .................. | F16L 39/005 285/123.15 |
| 2005/0178880 A1 * | 8/2005 | Howe | .................... | B64D 37/04 244/10 |
| 2007/0157454 A1 * | 7/2007 | Keefer | ............... | F16L 13/0209 29/525.13 |
| 2008/0128430 A1 * | 6/2008 | Kovach | ................. | B64D 37/06 220/586 |
| 2009/0246053 A1 * | 10/2009 | Wright | ..................... | F16L 5/02 417/572 |
| 2011/0154886 A1 * | 6/2011 | Carns | ................... | F16L 23/003 73/46 |

FOREIGN PATENT DOCUMENTS

| | | |
|---|---|---|
| EP | 1914465 | 4/2008 |
| FR | 2456277 | 12/1980 |

* cited by examiner

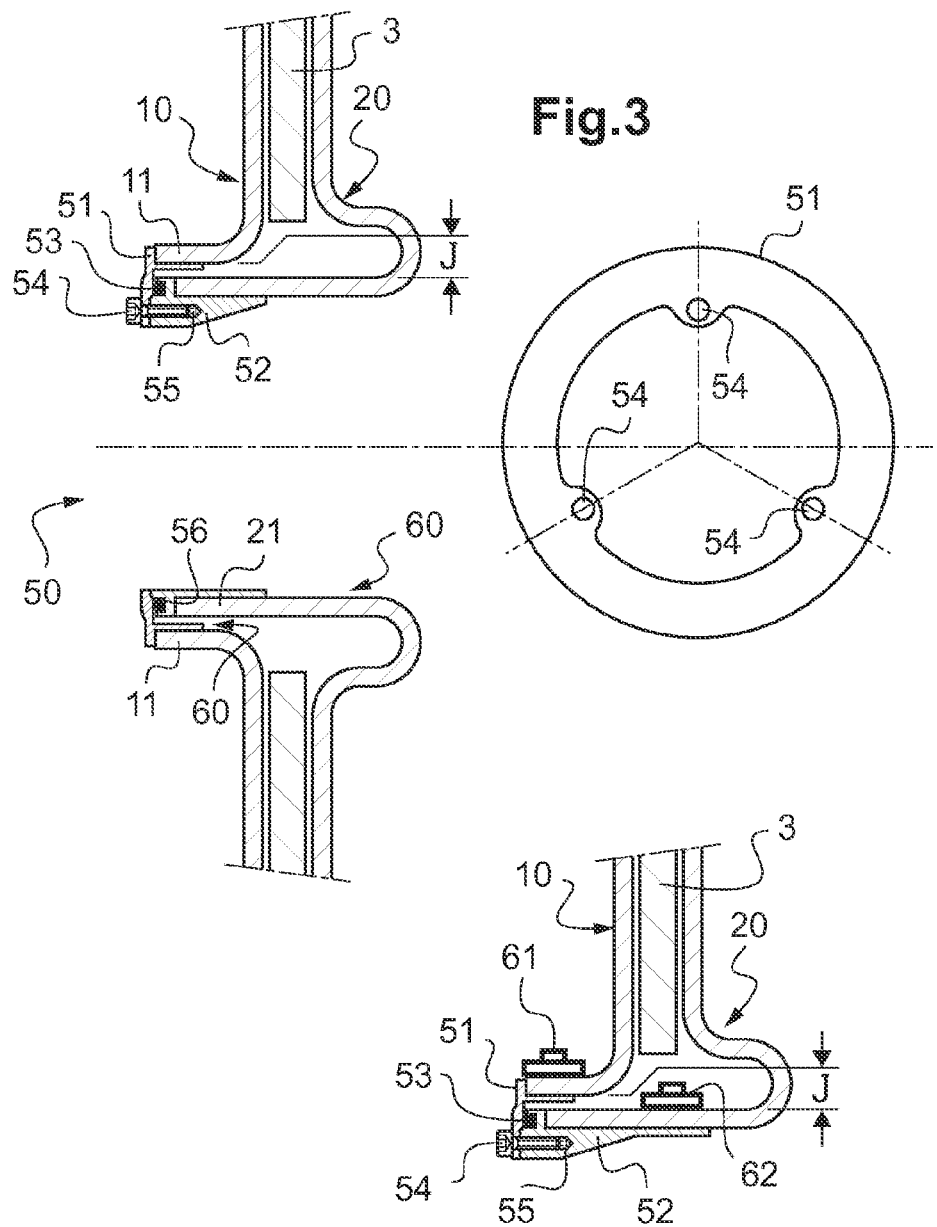

REMOVABLE COUPLING DEVICE FOR COUPLING TOGETHER TWO FLEXIBLE PIPES

CROSS REFERENCE TO RELATED APPLICATION

This application claims priority to French patent application No. FR 13 01519 filed on Jun. 28, 2013, the disclosure of which is incorporated in its entirety by reference herein.

BACKGROUND OF THE INVENTION (1) Field of the Invention

The present invention relates to the field of storing and transferring fluids, in particular liquids.

The present invention relates to a removable coupling device for coupling together two flexible pipes (or "hoses"), said removable coupling device being more particularly designed to connect a fuel tank of an aircraft to a pipe, or else to interconnect two tanks of an aircraft.

The present invention also relates to a fuel storage system using such a removable coupling device for coupling together two tanks, and to an aircraft using such a fuel storage system.

(2) Description of Related Art

In aircraft, and in particular in rotary-wing aircraft, it is frequent to have a plurality of fuel tanks. Such tanks are generally flexible and are received in compartments separated by structural partitions. Such compartments and such structural partitions can be situated in a lower structure of the aircraft, e.g. under the floor of the cabin of the aircraft, or else in vertical structures of the aircraft, such as transverse or lateral walls.

In addition, such tanks can be connected together in order to enable fuel to flow. A connection between two tanks is often obtained by equipping each tank with a flexible pipe, the two flexible pipes then being coupled together. The coupling between the two pipes is generally situated inside one of the two tanks, the pipe of that tank being folded back towards the inside of the tank, while the pipe of the other tank passes through the structural partition of the aircraft separating the two tanks.

Such a coupling between two tanks or else between a tank and a pipe is described in Document FR 2 456 277. That coupling is achieved by securing together two pipes by means of a clamping collar, a metal sleeve being positioned inside the pipes in order to stiffen the coupling. In addition, the two pipes are pressed against each other without adhesive bonding.

It is also possible to lubricate the connection between the two pipes by using fuel. Such lubrication thus enables one pipe to slide a little relative to the other.

The flexible pipes are generally made of elastomer adapted to transporting hydrocarbons, and they can include reinforcements embedded in their walls.

In addition, in Document CA 2 176 822, a coupling between a rigid male cylindrical pipe and a female device is achieved by a quick connector including deformable means and rigid means. Tabs on the deformable means acts as axial abutments by co-operating with grooves in the female device. Two O-ring gaskets positioned radially between the male cylindrical pipe and the female device seal the coupling.

In addition, Document U.S. Pat. No. 7,878,550 describes a sleeve interconnecting two conduits, that sleeve having a flexible first end, a semi-rigid second end, and its middle portion optionally being flexible. Each end is fastened mechanically to a respective one of the two conduits, without being bonded adhesively.

Furthermore, a coupling between two pipes interconnecting two tanks of an aircraft must also withstand a certain intensity of impacts and crashes that might be suffered by the aircraft. Thus, the coupling between two pipes must be suitable for receiving impacts and must enable the pipes and/or the tanks to be displaced so long as such impacts and displacements are of intensity or amplitudes less than predetermined limits. Such impacts or such displacements must not cause the coupling to break and must not cause either of the pipes to tear.

To this end, the coupling between two pipes is freely movable so as to reduce the concentrations of the stresses that would form where it is situated during impacts and/or displacements.

In addition, access to this type of coupling, for fitting it, removing it, or maintaining it, is generally from the inside of the cabin, after a portion of the floor has been removed by opening an inspection orifice for inspecting the tank.

Fitting and more particularly removing such a coupling can be difficult and complex. The two pipes tend to stick together after the fuel used for lubricating the coupling has dried. There is a high risk of tearing at least one of the two pipes during such removal, so that a maintenance operation can result in at least one tank being destroyed.

BRIEF SUMMARY OF THE INVENTION

An object of the present invention is thus to propose a coupling device for coupling together two tanks that enables the above-mentioned limitations to be overcome. The coupling device should thus be easy to remove so that there is no risk of tearing during a maintenance operation, while also having the same sealing and impact-resistance characteristics.

The invention provides a removable coupling device for coupling together two flexible pipes.

Said removable coupling device is remarkable in that it comprises two connector seats, each connector seat being suitable for being secured to a respective one of said pipes by at least one securing means. Said connector seats are assembled mechanically together by at least one removable fastener means, and sealing between the two connector seats is provided by at least one gasket.

Each connector seat that is suitable for being secured to a respective one of the two flexible pipes is of a general shape that is equivalent to the general shape of the pipe to which it is secured. For example, each pipe is cylindrical and of circular cross-section and, as a result, each connector seat is cylindrical in general shape and of circular cross-section.

However, other pipe cross-sectional shapes and therefore other connector seat cross-sectional shapes are possible, such as, for example, an oval cross-section.

Preferably, the pipes are coaxial. When the pipes are not coaxial, the connector seats take account of the geometrical differences of said pipes, and in particular of the offset between their axes.

A first securing means securing each connector seat to a respective pipe is preferably constituted by adhesive bonding. Each connector seat may be adhesively bonded to the inside surface or to the outside surface of the corresponding pipe.

The adhesive used for constituting this first securing means is fully compatible with the fluid flowing through the pipe, which fluid is, for example, fuel.

In addition, the surface area over which a connector seat and the corresponding pipe are secured together may be of various sizes, e.g. so that the securing is sufficiently strong, or so that the rigidity of the connection between the connector seat and the pipe is increased.

In addition, the connector seats are preferably rigid, e.g. the connector seats are made of metal. In particular, one of the two connector seats for the inner pipe may act as a sleeve so as to provide rigidity for the connection assembly. For this purpose, at least one of the connector seats must have length sufficient to provide such rigidity.

At one of its ends, each pipe may have a straight zone. It is over this straight zone of the pipe that the connector seat is secured to said pipe.

Furthermore, a second securing means for securing a pipe to a connector seat may be used instead of the first securing means, i.e. instead of the adhesive bonding, or indeed in addition to said first securing means. For example, said second securing means may be constituted by a clamping collar that is put in place around the assembly made up of a pipe and of a connector seat.

When such a clamping collar is used as the second securing means, each connector seat must be rigid and positioned inside the pipe to which it is secured, said clamping collar then being positioned on the outside of said pipe.

The two connector seats are assembled together via at least one removable fastener means. The connector seats are easily removable for the purpose of separating the two pipes, e.g. for performing maintenance operations. For example, a removable fastener means is constituted by a screw, a tapped hole being present in a first connector seat, and the second connector seat then being clamped onto the first connector seat via said screw and via said tapped hole.

Therefore, since the two connector seats are assembled together via the removable fastener means, the removable coupling device of the invention advantageously eliminates any contact between the two pipes interconnected by the device. Non-zero clearance is present between the two pipes and any risks of sticking and therefore any risks of tearing on removing at least one of the pipes are eliminated.

In addition, the use of at least one removable fastener means between the two connector seats contributes rigidity to the assembly comprising the two connector seats, and therefore to the coupling device of the invention. Advantageously, this rigidity is obtained without adversely affecting the flexibility necessary to assembling together the two pipes. These two pipes are flexible and, although they are interconnected via the two connector seats, they can receive impacts and be displaced a little without causing the coupling device to break or either of the two pipes to tear.

In addition, one or more gaskets may be placed between the two pipes in order to provide the sealing for the coupling device. Advantageously, each gasket is simple to replace.

For example, a flat gasket may be placed on a plane surface of a first connector seat, the second connector seat then coming to flatten the flat gasket when the two connector seats are assembled together.

In another example, one or more O-ring gaskets may be placed in a groove arranged in a first connector seat. The second connector seat then comes to flatten each O-ring gasket when the two connector seats are assembled together, thereby sealing the coupling device.

Thus, any maintenance of the coupling device of the invention is facilitated and has no effect on the characteristics of the coupling device of the invention. The connector seats, and therefore the pipes, are easy to fit and to remove by means of the use of at least one removable fastener means. In addition, the sealing of the coupling device is provided by the gasket(s) that is/are simple to replace. Finally, the impact-withstanding qualities of the coupling device are preserved.

The present invention also provides a fuel storage system comprising at least two tanks, each tank having at least one flexible pipe. Such a fuel storage system has at least one removable coupling device as described above interconnecting two tanks via two flexible pipes.

Advantageously, the use of such a removable coupling device in this fuel storage system makes it possible to facilitate the coupling.

Each of the connector seats of this coupling device may be secured independently to a respective pipe for each tank. This securing operation may be performed without any constraint of another tank being present or being in the vicinity.

Therefore, only the final assembly of the two connector seats via at least one removable fastener means is performed with such constraints of another tank being present or being in the vicinity.

In addition, this assembly operation is also simplified by using fastener means that are removable such as screws.

The present invention also provides an aircraft including at least one fuel storage system such as defined above.

This aircraft includes at least two compartments that are separated by at least one structural partition. These compartments and these structural partitions may be situated in a lower structure of the aircraft placed under a cabin of the aircraft, the floor of said cabin covering said lower structure. These compartments and these structural partitions may also be situated in one or more vertical structures of the aircraft, such as transverse or lateral walls. Each compartment may include at least one tank of the fuel storage system. Two tanks can then be interconnected via an above-described removable coupling device, in particular through an orifice in a structural partition.

Advantageously, regardless of the securing means for securing a pipe to a connector seat of said removable coupling device, this securing operation may be performed outside the aircraft, it being possible for each tank to be deployable outside the aircraft. This operation can thus be performed without any difficulty directly on a pipe and independently for each tank. This securing can be performed without any constraint of another tank being present or being in the vicinity.

Then, the tanks are put in place in the compartments of the aircraft. With concern for optimizing the compactness of the tanks and of their mutual coupling, each removable coupling device can be placed inside a tank.

To this end, the pipe of the first tank is folded back into the inside of the first tank and the pipe of the second tank is also positioned inside said first tank. Assembling the two pipes together via the two connector seats of the coupling device and by at least one removable fastener means is then performed from the inside of the cabin, generally through an inspection orifice for inspecting said first tank. In this way, one of the two pipes finds itself inside the other pipe. The use of removable fastener means such as screws facilitates this assembly in spite of the difficulties of access via said inspection orifice.

Similarly, access to this type of coupling, for fitting it, removing it, or maintaining it, is generally from the inside of the cabin, after a portion of the floor has been removed. The use of removable coupling devices in the aircraft of the invention facilitates maintenance thereof.

Advantageously, although assembling the tanks together is simplified, such simplified assembly does not adversely affect the above-mentioned impact-resistance and crash-resistance properties of the pipes and of the tanks.

When, for example, the aircraft crashes, the flexibility of the pipes enables the pipes and/or the tanks to be displaced in order to prevent large stresses from being exerted, so as to prevent the removable coupling device from breaking, or the tanks or the pipes from tearing.

In addition, by their rigidity, the connector seats make it possible to improve this impact resistance and crash resistance of the pipes. For example, when a pipe passes through a structural partition, the length of a connector seat can be sufficient for the connector seat to project on either side from an orifice in the structural partition. When an impact takes place, and therefore when the pipe is displaced or when the structural partition is deformed, the rigidity of this connector seat then makes it possible to prevent said pipe from being damaged, or indeed destroyed.

BRIEF DESCRIPTION OF THE SEVERAL VIEWS OF THE DRAWINGS

The invention and its advantages appear in greater detail from the following description of embodiments given by way of illustration with reference to the accompanying figures, in which:

FIGS. 3 and 4 show two embodiments of a removable coupling device.

Elements that are present in more than one of the figures are given the same references in each of them.

DETAILED DESCRIPTION OF THE INVENTION

Figure 1:
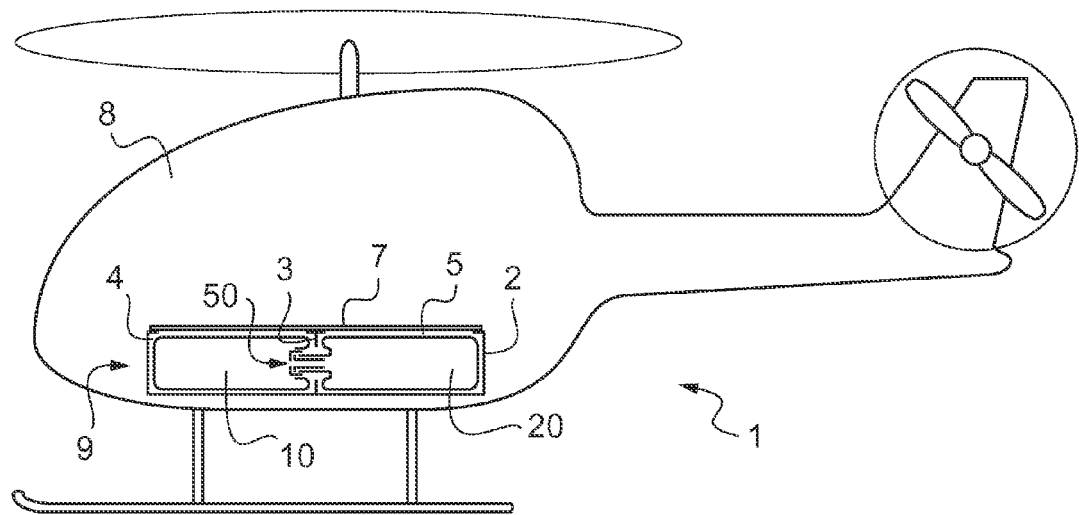
FIG. 1 shows an aircraft of the invention equipped with a fuel storage system.

FIG. 1 shows an aircraft 1, this aircraft 1 including a lower structure 2 below a cabin 8. This lower structure 2 has two compartments 4, 5 separated by a structural partition 3. A tank 10, 20 is disposed in each compartment 4, 5, the two tanks 10, 20 forming a fuel storage system 9. A floor 7 covers the lower structure 2, thereby protecting the tanks 10, 20, and constitutes the floor of the cabin 8 of the aircraft 1. A removable coupling device 50 of the invention interconnects the two tanks 10, 20 through the structural partition 3.

However, these compartments 4, 5 may also be situated in one or more vertical structures of the aircraft 1, such as transverse or lateral walls.

Figure 2:
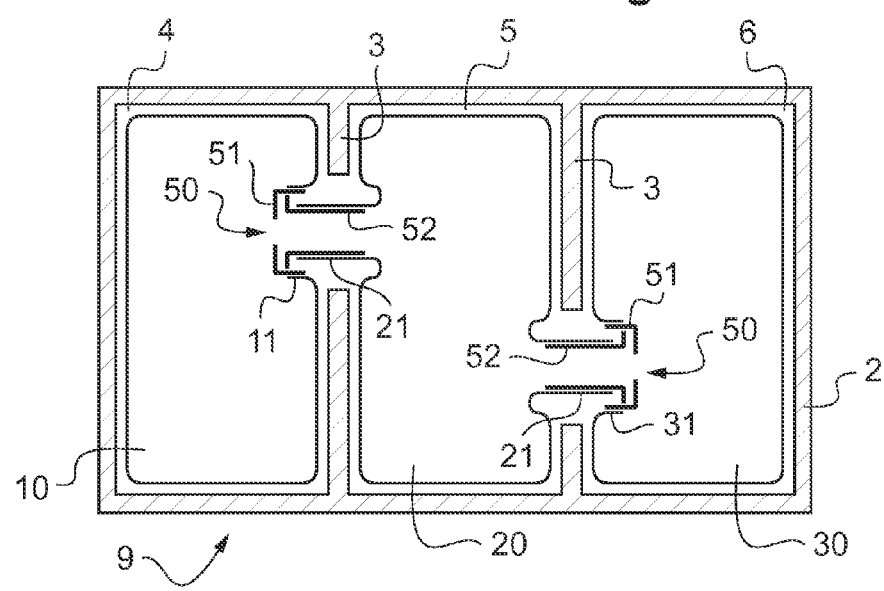
FIG. 2 shows a fuel storage system equipped with removable coupling devices.

FIG. 2 shows a fuel storage system 9 comprising three tanks 10, 20, and 30. This fuel storage system 9 is positioned in a lower structure 2 having three compartments 4, 5, 6, each compartment 4, 5, 6 containing a single tank 10, 20, 30, two structural partitions 3 separating respective pairs of the compartments 4, 5, 6. Removable coupling devices 50 of the invention interconnect the tanks 10, 20, 30 in pairs through the respective structural partitions 3.

Two embodiments of this removable coupling device 50 are shown in FIGS. 3 and 4. Each of these two embodiments of the invention may be used to interconnect the tanks 10, 20, 30 shown in FIGS. 1 and 2, the two interconnected tanks being separated by a structural partition 3.

Each of these two embodiments makes it possible to interconnect two flexible pipes 11, 21 belonging to respective ones of two tanks 10, 20. The removable coupling device 50 is situated inside a first tank 10 so as to optimize advantageously the volume occupied by said tanks 10, 20, and, therefore, so as to optimize advantageously the volume required for the fuel storage system 9. The pipes 11, 21 are of cylindrical shape and are of circular cross-section, although other cross-sectional shapes are possible, such as an oval cross-section. In addition, the pipes 11, 21 are coaxial.

The pipe 11 connected to the first tank 10 is therefore folded back into the inside of the first tank 10, while the pipe 21 connected to the second tank 20 extends outside said second tank 20 and towards the inside of the first tank 10. The second pipe 21 passes through the structural partition 3. In this way, the pipe 21 connected to the second tank 20 finds itself inside the pipe 11 connected to the first tank 10.

In addition, a gasket 53, such as an O-ring gasket, is positioned in a groove 56 arranged in a first connector seat 52. The second connector seat 51 then comes to flatten the gasket 53 when the two connector seats 51, 52 are assembled together, thereby sealing the removable coupling device 50.

However, a flat gasket or gasket may also be used and placed on a plane surface of a first connector seat 52, the second connector seat 51 then coming to flatten the flat gasket when the two connector seats 51 and 52 are assembled together.

In a first embodiment of the removable coupling device 50 that is shown in FIG. 3, the removable coupling device 50 is made up of two connector seats 51, 52 that are secured to respective ones of the pipes 11, 21 by securing means such as adhesive bonding 60. Each connector seat 51, 52 is adhesively bonded to the inside surface of a respective pipe 11, 21, but each connector seat 51, 52 may also be adhesively bonded to the outside surface of the respective pipe 11, 21.

The two connector seats 51, 52 are assembled together via at least one removable fastener means. The removable fastener means in this first embodiment are constituted by three screws 54, a first connector seat 52 being provided with three tapped holes 55 and a second connector seat 51 being fastened to the first connector seat 52 via the three screws 54.

At one end, each pipe 11, 21 has an straight zone onto which a respective connector seat 51, 52 is adhesively bonded. In addition, each connector seat 51, 52 is rigid. For example, each connector seat 51, 52 is made of metal. The assembly made up of a pipe 11, 21 and of a connector seat 51, 52 is thus rigid, even though each pipe 11, 21 is flexible.

The removable coupling device 50 constituted by the two connector seats 51, 52 assembled together by the removable fastener means is thus rigid. This rigidity makes it possible to facilitate assembly of the removable coupling device 50, without however degrading the impact resistance of the coupling device of the invention.

When, for example, the aircraft 1 crashes, the flexibility of the pipes 11, 21 enables the pipes 11, 21 and/or the tanks 10, 20 to be displaced in order to prevent large stresses from being exerted, so as to prevent the removable coupling device 50 from breaking, or the tanks 10, 20 or the pipes 11, 21 from tearing.

Advantageously, assembly of this removable coupling device 50 is also facilitated, it being possible for each connector seat 51, 52 to be assembled onto each pipe 11, 21 independently for each tank 10, 20.

Then, assembling together the two connector seats 51, 52, via the screws 54 constituting the removable fastener means is performed from the inside of the cabin 8, generally via an inspection orifice for inspecting the first tank 10. Use of these screws 54 facilitates this assembly in spite of the difficulties of access via said inspection orifice.

As a result, maintenance operations are facilitated, since the two pipes 11, 21 can then be readily separated.

Advantageously, since the two connector seats 51, 52 are assembled together via the removable fastener means, no contact is present between the two pipes 11, 21. Non-zero clearance J exists between the two pipes, and any risk of sticking and therefore any risk of tearing on removing at least one of the pipes, is eliminated.

In addition, each gasket is simple to replace during a maintenance operation.

In a second embodiment of the removable coupling device 50 that is shown in FIG. 4, the removable coupling device 50 is provided with second securing means for securing each pipe 11, 21 to the respective connector seat 51, 52. These second securing means are used in addition to the first securing means used for the first embodiment. The second securing means consist of a clamping collar 61, 62 put in place around each pipe 11, 21, each connector seat 51, 52 being positioned on the inside of the respective pipe 11, 21. The use of these clamping collars 61, 62 requires each connector seat 51, 52 to be rigid.

In addition, the first connector seat 52 secured to the pipe 21 is long enough firstly to enable the clamping collar 62 to be put in place around said pipe 21, and secondly to enable the first connector seat 52 to project on either side of an orifice in the structural partition 3. As a result, when the pipe 21 is displaced or when the structural partition 3 is deformed, e.g. because of the aircraft 1 crashing, the rigidity of this first connector seat 52 then makes it possible when contact or an impact occurs between said pipe 21 and said structural partition 3, to prevent said pipe 21 from being damaged or indeed destroyed.

Naturally, the present invention may be subjected to numerous variants as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A fuel storage system comprising at least two tanks, and at least one removable coupling device, each tank having at least one flexible pipe, each removable coupling device interconnecting two tanks via two of the pipes, the pipe of one tank being positioned inside the pipe of another tank;
   wherein the removable coupling device comprises two connector seats, each connector seat being secured by at least one securing means to a respective one of the pipes, the connector seats being assembled mechanically together by at least one removable fastener means, at least one gasket providing sealing between the connector seats, the removable coupling device being situated inside one of said two tanks that the removable coupling device interconnects.

2. A fuel storage system according to claim 1, wherein each connector seat has a cylindrical shape, the pipes being cylindrical.

3. A fuel storage system according claim 1, wherein the removable fastener means are provided by a screw to assemble together the connector seats mechanically.

4. A fuel storage system according to claim 1, wherein at least one of the two connector seats is provided with at least one groove for receiving the gasket.

5. A fuel storage system according to claim 1, wherein at least one gasket is an O-ring gasket.

6. A fuel storage system according to claim 1, wherein at least one gasket is a flat gasket.

7. A fuel storage system according to claim 1, wherein at least one of the connector seats is rigid.

8. A fuel storage system according to claim 7, wherein at least one of the connector seats is made of metal.

9. A fuel storage system according to claim 1, wherein at least one of the connector seats has sufficient length to ensure that the removable coupling device is rigid.

10. A fuel storage system according to claim 1, wherein the at least one securing means for securing a connector seat to a pipe is constituted by adhesive bonding.

11. A fuel storage system according to claim 1, wherein a second securing means for securing a connector seat to a pipe is constituted by at least one clamping collar.

12. A fuel storage system according to claim 1, wherein non-zero clearance exists radially between the two pipes interconnected by the removable coupling device.

13. A fuel storage system according to claim 1, wherein, with the fuel storage system having at least two compartments, and at least one structural partition, with each compartment having at least one tank and with any two compartments being separated by a respective structural partition of the at least one structural partition, one of the connector seats is of a length sufficient to project on either side of an orifice in the structural partition through which orifice one of the pipes passes.

14. An aircraft including at least two compartments separated by at least one structural partition, wherein the aircraft includes a fuel storage system according to claim 1, each of the at least two compartments including at least one tank of the at least two tanks.

15. An aircraft according to claim 14, wherein the aircraft includes a lower structure and a floor covering the lower structure, the compartments and each partition being situated in the lower structure.

16. A fuel storage system comprising:
   a first tank having a first flexible pipe connected thereto and positioned within an inside of the first tank;
   a second tank having a second flexible pipe connected thereto and extending outside the second tank and into the inside of the first tank, the second flexible pipe being received inside the first flexible pipe; and
   a removable coupling device positioned within the first tank and interconnecting the first flexible pipe and the second flexible pipe to interconnect the first tank and the second tank, the removable coupling device having a first connector seat and a second connector seat, the first connector seat secured to the first flexible pipe, the second connector seat secured to the second flexible pipe, the first and second connector seats mechanically assembled to one another via at least one fastener, the removable coupling device having at least one gasket positioned between the first and second connecting seats to provide sealing therebetween.

17. The fuel storage system according to claim 16 wherein the first flexible pipe is coaxial with the second flexible pipe adjacent to the removable coupling device.

18. The fuel storage system according to claim 16 wherein the first connector seat is secured to one of an inside surface and an outside surface of the first flexible pipe via an adhesive bond; and
   wherein the second connector seat is secured to one of an inside surface and an outside surface of the second flexible pipe via an adhesive bond.

19. The fuel storage system of claim 16 wherein the removable coupling device connects the first flexible pipe and the second flexible pipe to provide a non-zero radial clearance between an outer surface of the second flexible pipe and an inner surface of the first flexible pipe.

20. The fuel storage system of claim 16 wherein the first flexible pipe of the first tank is folded back into the inside of the first tank.

\* \* \* \* \*